United States Patent [19]

Takekoshi et al.

[11] 3,991,004

[45] Nov. 9, 1976

[54] METHOD FOR MAKING POLYETHERIMIDE

[75] Inventors: Tohru Takekoshi, Scotia, N.Y.; John E. Kochanowski, Pittsfield, Mass.

[73] Assignee: General Electric Company, Schenectady, N.Y.

[22] Filed: Jan. 2, 1975

[21] Appl. No.: 538,112

Related U.S. Application Data

[63] Continuation of Ser. No. 451,966, March 18, 1974, abandoned, and a continuation-in-part of Ser. No. 319,371, Dec. 29, 1972, abandoned.

[52] U.S. Cl. .......................... 260/37 N; 260/46.5 E; 260/47 CP; 260/49; 260/50
[51] Int. Cl.² .......................................... C08G 73/10
[58] Field of Search ........ 260/47 CP, 49, 65, 78 TF, 260/46.5 E, 50, 37 N

[56] References Cited

UNITED STATES PATENTS 3,699,075 10/1972 Lubowitz ............................... 260/49

*Primary Examiner*—Lester L. Lee
*Attorney, Agent, or Firm*—William A. Teoli; Joseph T. Cohen; Jerome C. Squillaro

[57] ABSTRACT

A method is provided for making polyetherimides involving the reaction of aromatic bis(etheranhydride)s and organic diamines in the presence of an inert nonpolar organic solvent at temperatures of at least 130° C. The polyetherimides are useful as injection molding compounds.

17 Claims, No Drawings

METHOD FOR MAKING POLYETHERIMIDE

This application is a continuation of application Ser. No. 451,966, filed Mar. 18, 1974 and now abandoned, and is a continuation-in-part of my copending application, Ser. No. 319,371, filed Dec. 29, 1972, and now abandoned, and assigned to the same assignee as the present invention.

Prior to the present invention, polyimides derived from the reaction of organic dianhydrides and organic diamines were generally thermoset and made by producing an intermediate polyamide acid. As shown by Edwards U.S. Pat. No. 3,179,614, the polyamide acid is preferably obtained by reacting the organic dianhydride and the organic diamine with a dipolar aprotic solvent at temperatures of 50° C or below. One of the reasons for careful temperature control is that premature formation of water of reaction leads to depolymerization of polymer. In addition imidization occurs as soon as the temperature exceeds optimum limits which can decrease polymer solubility and solution shelf life.

The present invention is based on the discovery that certain aromatic bis(etheranhydride) included by the formula, (1) 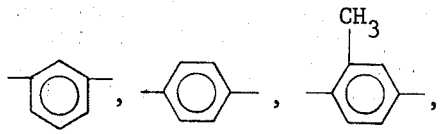

can be reacted with organic diamine included by the formula, (2) H$_2$NR$^1$NH$_2$ at temperatures of at least 130° C in the presence of an inert nonpolar organic solvent to provide thermoplastic polyetherimide, where R is a member selected from the class consisting of a. the following divalent organic radicals:

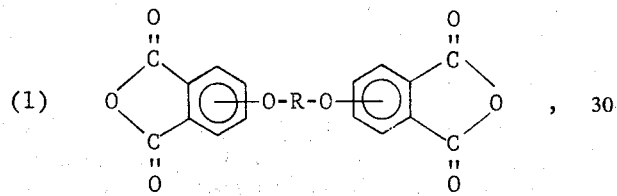

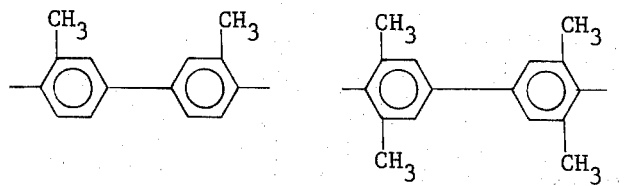

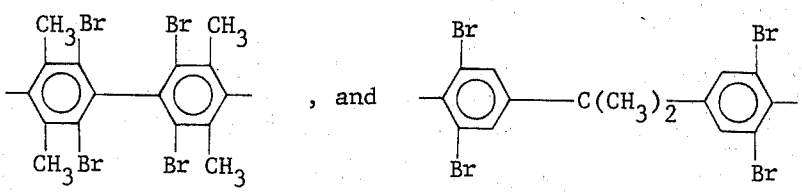

and b. divalent organic radicals of the general formula

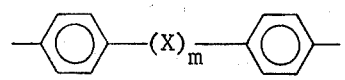

where X is a member selected from the class consisting of divalent radicals of the formulas

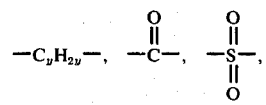

—O— and —S—, where $m$ is 0 or 1, $y$ is a whole number from 1 to 5, and R$^1$ is a divalent organo radical selected from the class consisting of (a) aromatic hydrocarbon radicals having from 6–20 carbon atoms and halogenated derivatives thereof, (b) alkylene radicals, C$_{(2-8)}$ alkylene terminated polydiorganosiloxane cycloalkylene radicals having from 2–20 carbon atoms, and (c) divalent radicals included by the formula,

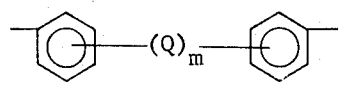

where Q is a member selected from the class consisting of

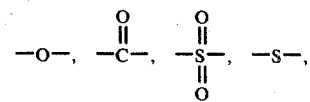

—C$_x$H$_{2x}$— and $x$ is a whole number from 1 to 5 inclusive, and $m$ is as previously defined.

There is provided by the present invention, a method for making a polyetherimide, which comprises, 1. effecting reaction between aromatic bis-(etheranhydride) of formula (1) and organic diamine of formula (2) in the presence of an inert nonpolar organic solvent at temperatures of at least 130° C while effecting the removal of water of reaction, and 2. separating said polyetherimide from the resulting mixture of (1), consisting essentially of said polyetherimide and said inert nonpolar organic solvent.

Included by the aromatic bis(etheranhydride)s of formula (1) are compounds having the formulas, (3) 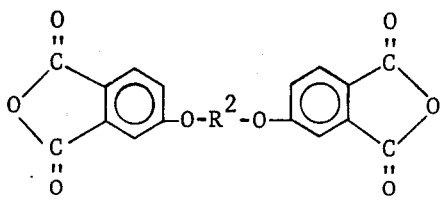

(4) 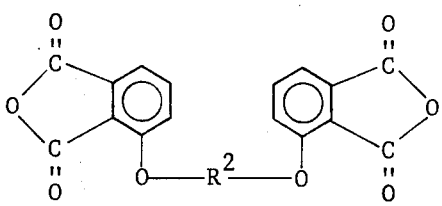

(5) 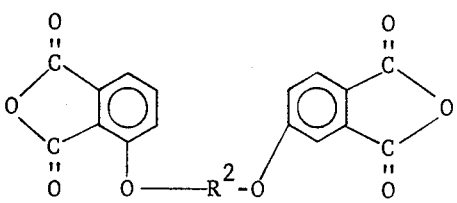

where $R^2$ is

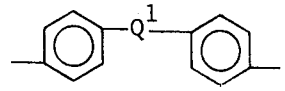, and $Q^1$ is selected from —O—, —S—,

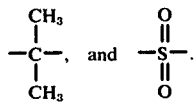

Dianhydrides included by formula (3) are for example
2,2'-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)diphenylsulfone dianhydride; etc.

Dianhydrides included by formulas (4) and (5) are for example,
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'(3,4-dicarboxyphenoxy)-2,2-diphenyl propane dianhydride, etc.

In addition to formulas 3 and 4 above, aromatic bis-(etheranhydride)s also included by formula (1) are shown by Koton, M. M.; Florinski, F. S.; Bessonov, M. I.; Rudakov, A.P. (Institute of Heteroorganic Compounds, Academy of Sciences, USSR) USSR 257,010, 11 November 1969, APPL 03 May 1967. In addition dianhydrides shown M. M. Koton, F. S. Florinski, Zh Org. Khin 4(5) 774 (1968).

Some of the aromatic bis(etheranhydride)s of formula (1) are shown in copending application of Darrell Heath and Joseph Wirth, Ser. No. 281,749, filed Aug. 18, 1972 and assigned to the same assignee as the present invention. These dianhydrides can be prepared from the hydrolysis, followed by dehydration of the reaction product of a nitro-substituted phenyl dinitrile with a metal salt of a dihydric phenol compound in the presence of a dipolar aprotic solvent. For example, a benzenoid compound of the formula,

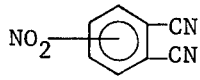

where the $NO_2$ group can be positioned anywhere in the benzene ring, can be reacted in dimethyl formamide with an alkali metal salt of a dihydric phenol of the general formula,

where $R^2$ is a divalent aromatic radical and Alk is an alkali metal ion. Various well known procedures can be used to convert the resulting tetranitriles to the corresponding tetra-acids and dianhydrides.

Included by the alkali metal salts of the above described dihydric phenols are sodium and potassium salts of the following dihydric phenols
2,2-bis(2-hydroxyphenyl)propane;
2,4'-dihydroxydiphenylmethane;
bis-(2-hydroxyphenyl)methane;
2,2-bis-(4-hydroxyphenyl)propane hereinafter identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3',5,5'-tetramethylbiphenyl;
2,4'-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide; etc.

In addition to the above described "Group A" dihydric phenols, there also can be employed in the present invention, aromatic bis(etheranhydride)s derived from the alkali metal salts of the following "Group B" dihydric phenols:
hydroquinone;
resorcinol;
4,4'-dihydroxydiphenylmethane;
4,4'-dihydroxybenzophenone;
4,4'-dihydroxydiphenyl ether and 2,2-bis(4-dihydroxyphenyl)propane Included by the organic diamines of formula (2) are for example,
m-phenylenediamine;
p-phenylenediamine;

4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis($\beta$-amino-t-butyl)toluene;
bis(p-$\beta$-amino-t-butylphenyl)ether;
bis(p-$\beta$-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane; etc.

Some of the inert nonpolar organic solvents which can be employed alone or as a mixture to effect reaction between aromatic bis(etheranhydride)s of formula (1) and organic diamines of formula (2) are for example, benzene, toluene, xylene, ethylbenzene, propylbenzene, chlorobenzene, dichlorobenzenes, trichlorobenzenes, biphenyl, terphenyl, diphenyl ether, diphenyl sulfide, acetophenone chlorinated biphenyls, chlorinated diphenylethers, dichloroethane, tetrachloroethane, trichloroethylene, tetrachloroethylene, methylcyclohexane, octane, isooctane, decane, etc.

The polyetherimide reaction products of aromatic bis(etheranhydride)s of formula (1) and organic diamines of formula (2) are soluble in organic solvents and can be cast from an organic solvent solution to a thermoplastic film. These polyetherimides can be molded at temperatures up to 400° C. A preferred class of injection moldable materials are polyetherimide reaction products of organic diamines of formula (2) and aromatic bis(etheranhydrides) of formulas (3–5). These injection moldable materials can be molded at temperatures of between 200° C. to 400° C. and are soluble in organic solvents such as methylene chloride, chloroform, N,N-dimethylformamide, N,N-dimethylacetamide, etc.

The above described moldable reaction products can be reinforced with conventional silica fillers for example perlite, fume silica, etc., carbon whiskers, glass fibers, etc. at proportions of from 10 to 60 parts of filler, per 100 parts of polyetherimide.

In the practice of the method of invention, reaction is effected between the aromatic bis(etheranhydrides) and the organic diamines in the presence of an inert nonpolar organic solvent.

The order of addition of either reactants is not critical. It is preferred to effect the reaction of the dianhydride and the organic diamine in an inert atmosphere such as nitrogen. Experience has shown that sufficient organic solvent should be utilized to provide a solids content in the range of between 1% to 90%.

Reaction can be effected at a temperature of from 130° C. to 300° C., and preferably 150° C. to 250° C.

In order to provide optimum contact between the aromatic bis(etheranhydride) and the organic diamine, the reaction mixture can be agitated such as by stirring, etc. Substantially equal moles of reactants has been found to provide for optimum molecular weight of polymer; however, there can be employed from 0.5 to 2 moles and preferably 0.9 to 1.1 moles of aromatic bis(etheranhydride) per mole of organic diamines for effective results. It has been found that the polyetherimide can have from about 5 to 500 repeating aromatic bis(etheranhydride)-organic diamine reaction product units and preferably 10 to 50. Terminal amino or phthalic acid end groups can be present.

Reaction time of the aryloxydianhydride of formula (1) and the organic diamine of formula (2) can vary from 0.5 to 20 hours depending upon such factors as the temperature employed, degree of stirring, nature of the reactants, etc.

During the course of polymer formation, water of reaction is continuously removed. The course of the reaction can be readily determined by the actual amount of water generated, as a percentage of the theoretical. In particular instances, a mixed solvent system can be employed consisting of a low boiling azeotropic solvent and a higher boiling solvent.

At the termination of the reaction, recovery of polyetherimide can be effected by pouring the polymer solution upon cooling into a precipitant such as methanol etc., followed by washing, filtering, etc.

In order that those skilled in the art will be able to practice the invention, the following examples are given by way of illustration and not by way of limitation. All parts are by weight.

EXAMPLE 1

A mixture of 2,2-bis[4-(3,4-dicarboxyphenoxy)-phenyl] propane dianhydride (3,000 parts), 4,4'-diaminodiphenylmethane (1.1427 parts) and orthodichlorobenzene (40 parts) was stirred and heated to reflux for four hours. In the course of the reaction, water formed was removed by azeotropic distillation. Upon cooling, the reaction mixture was poured in methanol to isolate the polymer. The yield was 3.22 parts. The intrinsic viscosity of the polymer was 0.39 dl/g in dimethylformamide. The elemental analysis found was: C, 77.9%; H, 4.7%; N, 4.1%; calc. for ($C_{44}H_{30}N_2O_6$); C, 77.4%; H, 4.4%; N, 4.1%. The infrared spectrum: $\lambda_{max}$ 1770, 1714, 1352, 1274 and 1239 $cm^{-1}$. The thermal decomposition temperature of the polymer was 490° C in nitrogen and 440° C in air as determined by thermal gravimetric analysis. Based on method of preparation, elemental analysis and spectral data, the product was a polyetherimide.

The above polyetherimide is molded at a temperature of 275° C. using a pressure of 5000–10,000 psi. There is obtained a finished part conforming to the dimensions of the mold.

EXAMPLE 2

A mixture of 2,2-bis[4-(2,3-dicarboxyphenoxy)-phenyl] propane dianhydride (3.0000 parts), 4,4'-diaminodiphenyl ether (1.1540 parts) and 40 parts orthodichlorobenzene was stirred and heated, to reflux for four hours under a nitrogen atmosphere. In the course of the reaction, water formed was removed by azeotropic distillation. Upon cooling, the reaction mixture was poured into methanol to isolate the product. The yield was 4.0 parts. The intrinsic viscosity of the polymer was 0.33 dl/g in dimethylformamide. The elemental analysis found was: C, 77.6%; H, 4.4%; N, 4.0%: calculated for $(C_{43}H_{28}N_2O_7)_n$; C, 77.4%, H, 4.4%; N, 4.1%. The infrared spectrum: $\lambda_{max}$ 1769, 1712, 1380, and 1250 cm$^{-1}$. The thermal decomposition of the polymer was 480° C in nitrogen and 410° C in air as determined by thermal gravimetric analysis. Based on the method of preparation, elemental analysis and spectral data, the product was a polyetherimide.

The above polyetherimide is molded in accordance with the procedure of Example 1.

EXAMPLE 3

A mixture of 2,2-bis[4-(3,4-dicarboxyphenoxy)-phenyl] propane dianhydride (3.0000 parts), 4,4'-diaminodiphenyl ether (1.1540 parts), and 40 parts orthodichlorobenzene was stirred and heated to reflux for four hours under a nitrogen atmosphere. In the course of the reaction, water formed was removed by azeotropic distillation. Upon cooling, the reaction mixture was poured into methanol, to isolate the product. The yield was 3.5 parts. The intrinsic viscosity of the polymer was 0.33 dl/g in dimethylformamide. The elemental analysis found was: C, 75.3%; H, 4.4%; and N, 3.8%; calculated for $(C_{43}H_{28}N_2O_7)_n$ is: C, 75.4%; H, 4.1% and N, 4.1%. The infrared spectrum: $\lambda_{max}$ 1767, 1712, 1372, 1275, 1244, and 1217 cm$^{-1}$. The thermal decomposition temperature of the polymer was 510° C in nitrogen and 410° C in air as determined by thermal gravimetric analysis. Based on method of preparation, elemental analysis and spectral data, the product is a polyetherimide.

The above polyetherimide is molded in accordance with Example 1.

EXAMPLE 4

A mixture of 2,2-bis[4-(2,3-dicarboxyphenoxy)-phenyl] propane dianhydride (3.0000 parts), 4,4'-methylenedianiline (1.1427 parts) and 40 parts ortho-dichlorobenzene was stirred and heated to reflux for four hours under a nitrogen atmosphere. In the course of the reaction, water was removed by azeotropic distillation. Upon cooling, the reaction mixture was poured into methanol to isolate the polymer. The yield was 3.74 parts. The intrinsic viscosity was 0.65 dl/g in dimethylformamide. The elemental analysis found was: C, 77.8%; H, 4.5% and N, 4.1%; calculated for $(C_{44}H_{30}N_2O_6)_n$ is C, 77.4%; H, 4.4%, and N, 4.1%. The thermal decomposition, temperature of the polymer was 420° C in nitrogen and 420° C in air as determined by thermal gravimetric analysis.

A sample of the above polymer is found to be readily moldable in accordance with the procedure of Example 1.

EXAMPLE 5

A mixture of 2,2-bis[4-(3,4-dicarboxyphenoxy)-phenyl]-propane dianhydride (3.4689 parts), 4,4'-methylenedianiline, diphenyl ether (40 parts) and toluene (5 parts) was stirred and heated to reflux for four and one half hours. In the course of the reaction water formed was removed by azeotropic distillation. Upon cooling, the reaction mixture was poured into methanol to isolate the product. The yield was 4.5 parts. The intrinsic viscosity of the polymer was 0.43 dl/g in dimethylformamide. The elemental analysis found was: C, 77.9%; H, 4.7% and N, 4.1%. Calculated for $(C_{44}H_{30}N_2O_6)_n$: C, 77.4%; H, 4.4% and N, 4.1%. The infrared spectrum: $\lambda_{max}$ 1770, 1714, 1352, 1274 and 1239 cm$^1$. Based on method of preparation, elemental analysis and spectral data, the product was a polyetherimide.

The above material is readily moldable to a finished part at a temperature of 275° C.

EXAMPLE 6

A mixture of 2,2-bis[4-(3,4-dicarboxyphenoxy)-phenyl]propane dianhydride (6.820 parts), bis(3-aminopropyl)tetramethyldisiloxane (3.255 parts) and o-dichlorobenzene (60 parts) was heated to reflux under nitrogen for two hours during which time the water formed was removed by azeotropic distillation. The reaction mixture was poured into isopropanol to isolate a tacky polymer product. The polymer was dissolved in methylene chloride and reprecipitated in isopropanol. The yield of the fibrous polymer product was 8.25 part (85.5%). The intrinsic viscosity of the polymer was 0.38 dl/g in chloroform and the glass transition temperature was 93° C.

EXAMPLE 7

A mixture of 2,2-bis[4-(3,4-dicarboxyphenoxy)-phenyl]propane dianhydride (1.5000 parts), 2,2-bis[4-(2,3-dicarboxyphenoxy)-phenyl]propane (1.5000 parts) 4,4'-diaminodiphenyl ether (1.1520 parts), trichlorobenzene (45 parts), and toluene (5 parts) was stirred and heated to reflux for 5 hours under a nitrogen atmosphere. In the course of the reaction, water formed was removed by azeotropic distillation. Upon cooling, the reaction mixture was poured into methanol to isolate the product. The yield was 3.78 parts. The intrinsic viscosity was 0.34 dl/g in dimethyl-formamide. The infrared spectrum: $\lambda_{max}$ 1768, 1700, 1360, 1250, 1073 cm$^{-1}$.

EXAMPLE 8

A mixture of 4-(2,3-dicarboxyphenoxy)-4'(3,4-dicarboxyphenoxy)-2,2-diphenylpropane dianhydride (5.204 parts), 4,4'-diaminodiphenylmethane (2.002 parts), 50 parts of 1,2,4-trichlorobenzene and 5 parts of toluene was stirred and heated to reflux for 4 hours. The water formed was continuously removed by azeotropic distillation. The polymer was isolated by pouring the reaction mixture into methanol. The yield of the polymer was quantitative. The structure of the polymer was conformed by infrared and nuclear magnetic resonance spectroscopies of the chloroform solution.

EXAMPLE 9

A mixture of 1,4-bis(2,3-dicarboxyphenoxy)benzene dianhydride (20.115 parts), 4,4'-diaminodiphenylmethane (9.913 parts) and 300 parts of trichlorobenzene was heated to reflux for ten hours. The water formed during the reaction was removed by azeotropic distillation. The resulting polymer suspension was poured into methanol to isolate 26.1 parts of polymer. The intrinsic viscosity obtained in meta-cresol was 0.39 dl/g. The infrared spectrum: $\lambda_{max}$ 1772, 1715, 1378, 1249 and 1185 and 1185 cm$^{-1}$.

EXAMPLE 10

A mixture of 4,4'-bis(2,3-dicarboxyphenoxy) biphenyl dianhydride (3.7962 parts) hexamethylenediamine (.9213 parts), nitrobenzene (35 parts) and toluene (10 parts) were mixed and heated to reflux for four hours. In the course of the reaction, water formed was removed by azeotropic distillation. Upon cooling, the reaction mixture was poured into methanol to isolate the product. The yield was 3.82 parts. The intrinsic viscosity was 0.37 dl/g in meta-cresol. The infrared spectrum: $\lambda_{max}$ 1762, 1700, 1395, 1268, 1202, and 1163 cm$^{-1}$.

EXAMPLE 11

A mixture of 2,2-bis[4-(2,3-dicarboxyphenoxy)phenyl]propane dianhydride (1.5000 parts), 2,2-bis[4-(3,4-dicarboxyphenoxy)phenyl]propane dianhydride (1.5000 parts), 4,4'-diaminodiphenyl ether (1.1520 parts), trichlorobenzene (45 parts) and toluene (5 parts) was stirred and heated to reflux under a nitrogen atmosphere for four and one half hours. Upon cooling, the mixture was poured into methanol to isolate the polymer. The yield was 3.78 parts. The intrinsic viscosity was 0.34 dl/g in chloroform. The infrared spectrum showed that the product was a polyetherimide.

EXAMPLE 12

A mixture of 2,2-bis[4-(3,4-dicarboxyphenoxy)phenyl]propane dianhydride (6.828 parts), methylenedianiline (2.341 parts), bis(3-aminopropyl)tetramethyldisiloxane (0.326 part) and o-dichlorobenzene (60 parts) was heated to reflux (183° C) for 2.5 hours during which time water formed was removed as an azeotropic mixture. The resulting polymer solution was cooled and poured into methanol to isolate 8.47 parts of polymer. The polymer possessed the intrinsic viscosity of 0.48 dl/g in chloroform and glass transition temperature of 191° C as determined by differential scanning calorimetry.

EXAMPLE 13

A mixture of 4,4'-bis(3,4-dicarboxyphenoxy)diphenyl sulfide (2.8457 parts), bis(4-aminobutyl)tetramethyldisiloxane (1.5407 parts), trichlorobiphenyl, (mixed isomers) (35 parts) and toluene (5 parts) was stirred and heated to reflux for four hours. In the course of reaction, water formed was removed by azeotropic distillation. Upon cooling, the reaction mixture was poured into methanol to isolate the product. The yield of the polymer was 4.0 parts. The intrinsic viscosity of the polymer was 0.43 dl/g in meta-cresol. The infrared spectrum: 1762, 1700, 1385, 1205 and 1162 cm$^{-1}$. The thermal decomposition temperature of the polymer was 450° C in nitrogen and 410° C. in air as determined by thermal gravimetric analysis.

EXAMPLE 14

A mixture of 4,4'-bis(2,3-dicarboxyphenoxy)diphenyl ether dianhydride (3.0000 parts), 4,4'-diaminodiphenyl ether (1.2141 parts), acetophenone (35 parts) and toluene (5 parts) was stirred and heated to reflux under nitrogen atmosphere for five hours. In the course of the reaction, water formed was removed by azeotropic distillation. Upon cooling, the mixture was poured into methanol to isolate the polymer. The yield was 2.54 parts. The intrinsic viscosity of the polymer was 0.35 dl/g in meta-cresol. The infrared spectrum confirmed the polymer was a polyetherimide. Elemental analysis gives: C, 72.4%; H, 3.4% calculated for $(C_{40}H_{24}N_2O_8)_n$ is C, 72.7%, H, 3.6%. The thermal decomposition temperature of the polymer was 480° C in nitrogen and 480° C in air as determined by thermal gravimetric analysis.

EXAMPLE 15

A mixture of 2,2-bis[4-(2,3-dicarboxyphenoxy)phenyl]propane dianhydride (6.0000 parts) 4,4'-oxydianiline (3.3040 parts), orthodichlorobenzene (90 parts) and toluene (10 parts) was stirred and heated to reflux for four hours. Upon cooling, glass fibers (5.4 parts) were added with stirring. Solvent was removed in vacuo. The resulting material was a glass re-inforced polyetherimide.

EXAMPLE 16

A mixture of 4,4'-diaminodiphenylmethane (1.9826 parts), approximately one to one mixture of 2,2-bis[4-(2,3-dicarboxyphenoxy)phenyl]propane dianhydride and 2,2-bis[4-(3,4-dicarboxyphenoxy)phenyl]propane dianhydride (5.2047 parts), ortho-dichlorobenzene (60 part) and toluene (10 parts) was stirred and heated to reflux for four hours under nitrogen atmosphere. In the course of the reaction, water was removed by azeotropic distillation. Upon cooling, the viscous reaction mixture was poured into methanol to isolate the fibrous precipitate of polyetherimide. The yield was 6.43 parts. The polymer was soluble in chloroform, dimethylformamide and meta-cresol.

EXAMPLE 17

A mixture of 5.101g (9.8 × 10$^{-3}$ mol) of 2,2-bis[4-(3,4-dicarboxyphenoxy)phenyl] propane dianhydride, 1.0814g (1.0 × 10$^{-3}$ mol) of 1,3-diaminobenzene and 0.0592g (0.4 × 10$^{-3}$ mol) of phthalic anhydride was stirred with 20 ml of freshly distilled o-dichlorobenzene at room temperature under a nitrogen atmosphere. The mixture was heated to reflux with an oil bath (230° C) and the water of reaction was removed by allowing it to distill out of the reaction mixture. This process was aided by a slight positive pressure of nitrogen. After 1 hour at reflux, a modified, recirculating Dean Stark trap filled with calcium hydride was attached to the reaction flask and the solution was refluxed an additional 3½ hours to remove the last traces of water. The mixture was cooled to room temperature and then diluted with 20 ml of chloroform. This homogeneous solution was precipitated with methanol in a blender and the white polymer was collected by filtration and dried in a vacuum oven at 120° C to give 5.5g (93%) of material. (I.V. = 0.46 (CHCl$_3$);

$$GPC \frac{M_w}{M_n} = \frac{44232}{23457} = 1.89).$$

The above examples are limited to only a few of the very many variables in conditions and reactants used in the practice of the method and compositions made thereby. It should be understood that the present invention is directed to a much broader class of polyetherimides as produced from aromatic bis(etheranhydride) of formula (1) and organic diamines of formula (2).

What we claim as new and desire to secure by Letters Patent of the United States is:

1. A method for making polyetherimide which comprises
   1. refluxing a mixture containing as essential ingredients an aromatic bis(ether anhydride) of the formula

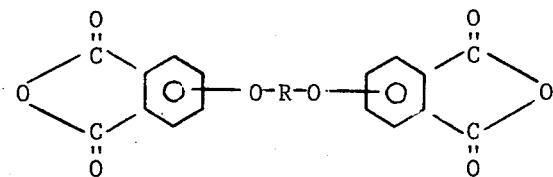

an organic diamine of the formula

and an inert nonpolar organic solvent at temperatures of from 130° C to 300° C while continuously effecting the removal of water of reaction during the course of polymer formation and
   2. separating said polyetherimide at the termination of the reaction from the resulting reaction mixture of (1), consisting essentially of said polyetherimide and said inert nonpolar organic solvent, where R is a member selected from the class consisting of (a) the following divalent organic radicals:

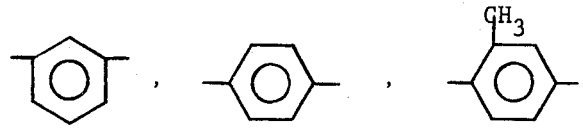

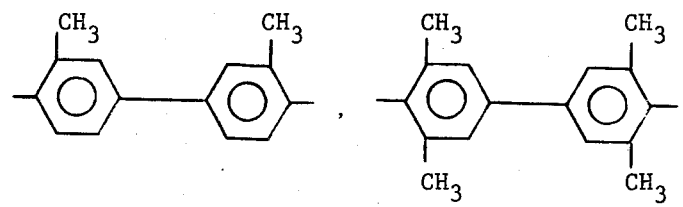

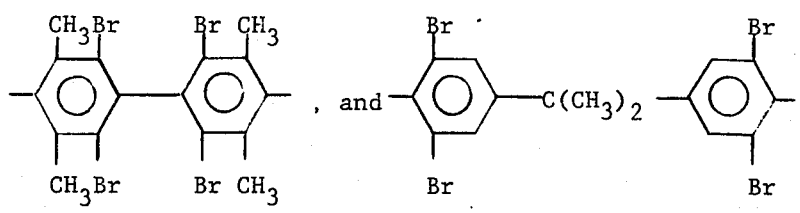

and (b) divalent organic radicals of the general formula

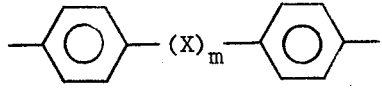

where X is a member selected from the class consisting of divalent radicals of the formulas $-C_yH_{2y}-$,

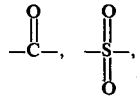

$-O-$ and $-S-$, where $m$ is 0 or 1, $y$ is a whole number from 1 to 5, and $R^1$ is a divalent organo radical selected from the class consisting of (a) aromatic hydrocarbon radicals having from 6–20 carbon atoms and halogenated derivatives thereof, (b) alkylene radicals, $C_{(2-8)}$ alkylene terminated polydiorganosiloxane cycloalkylene radicals having from 2–20 carbon atoms, and (c) divalent radicals included by the formula,

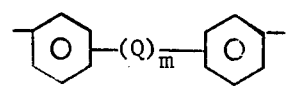

where Q is a member selected from the class consisting of $-O-$,

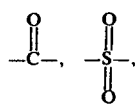

$-S-$, $-C_xH_{2x}-$ and $x$ is a whole number from 1 to 5 inclusive, and $m$ is as previously defined.

2. A method in accordance with claim 1, where the aromatic bis(etheranhydride) has the formula,

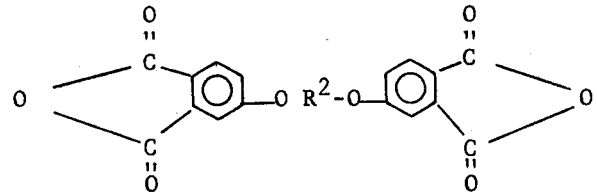

$R^2$ is selected from

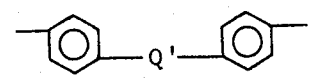

and Q' is selected from the class consisting of —O—, —S—,

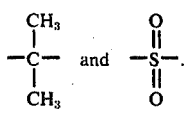

3. A method in accordance with claim 1, where the aromatic bis(etheranhydride) has the formula,

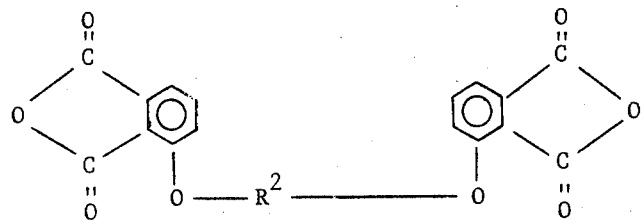

where R² is defined above.

4. A method in accordance with claim 1, where the mixed anhydride has the formula,

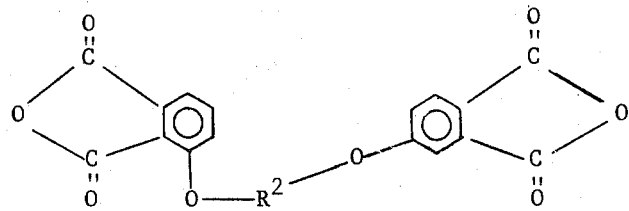

where R² is defined above.

5. A method in accordance with claim 1, where the aromatic bis(etheranhydride) is 2,2-bis[4-(3,4-dicarboxyphenoxy)-phenyl]-propane dianhydride.

6. A method in accordance with claim 1, where the aromatic bis(etheranhydride) is 2,2-bis[4-(2,3-dicarboxyphenoxy)-phenyl]-propane dianhydride.

7. A method in accordance with claim 1, where the organic diamine is oxydianiline.

8. A method in accordance with claim 1, where the organic diamine is methylenedianiline.

9. A method in accordance with claim 1 where the organic diamine is metaphenylene diamine.

10. A method in accordance with claim 1, where the organic solvent is dichlorobenzene.

11. A method in accordance with claim 1, where the organic solvent is diphenylether.

12. A method in accordance with claim 1, where said reaction is conducted in the presence of a mixture of solvents.

13. A method in accordance with claim 1, where nitrogen atmosphere is employed.

14. A method in accordance with claim 1, where a mixture of aromatic bis-(etheranhydride)s is employed.

15. A method in accordance with claim 1, where a mixture of organic diamines is employed.

16. A method in accordance with claim 1, where the reaction is conducted in the presence of filler.

17. A method in accordance with claim 1, where the filler is glass fiber.

* * * * *

UNITED STATES PATENT OFFICE
CERTIFICATE OF CORRECTION

PATENT NO. : 3,991,004
DATED : Nov. 9, 1976
INVENTOR(S) : Tohru Takekoshi and John E. Kochanowski It is certified that error appears in the above-identified patent and that said Letters Patent are hereby corrected as shown below:

Column 3, line 5, cancel

" 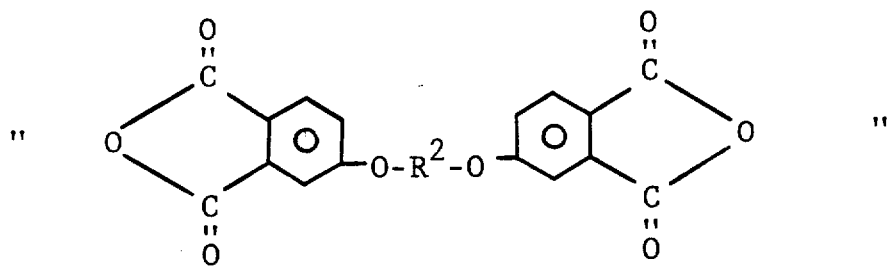 "

and substitute

-- 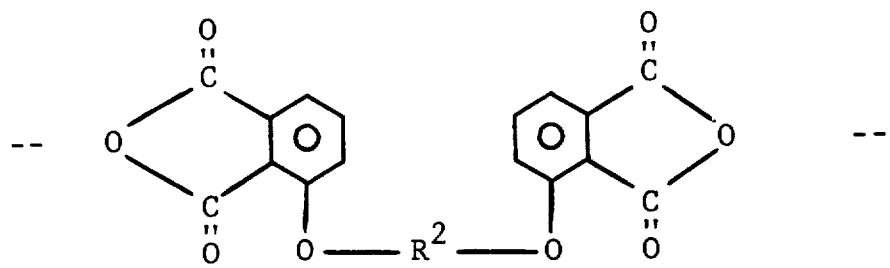 --

UNITED STATES PATENT OFFICE
CERTIFICATE OF CORRECTION

PATENT NO. : 3,991,004

DATED : Nov. 9, 1976

INVENTOR(S) : Tohru Takekoshi and John E. Kochanowski

It is certified that error appears in the above-identified patent and that said Letters Patent are hereby corrected as shown below:

Column 3, line 15, cancel

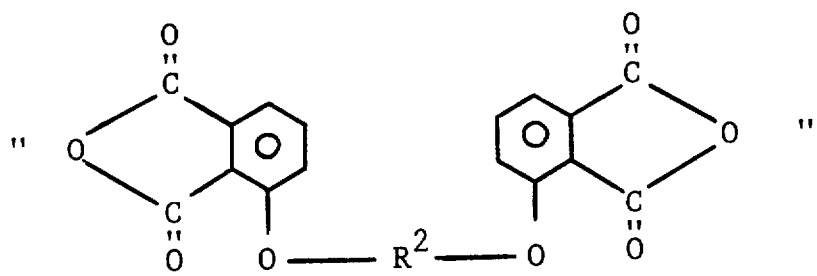

and substitute

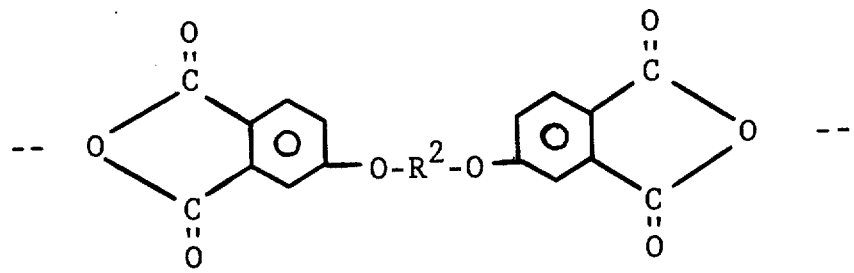

UNITED STATES PATENT OFFICE
CERTIFICATE OF CORRECTION

PATENT NO. : 3,991,004
DATED : Nov. 9, 1976
INVENTOR(S) : Tohru Takekoshi and John E. Kochanowski It is certified that error appears in the above-identified patent and that said Letters Patent are hereby corrected as shown below:

Column 4, line 29, cancel

" $Alk-O-R^2-Alk$ "

and substitute

-- $Alk-O-R^2-O-Alk$ --

Signed and Sealed this

Fifth Day of April 1977

[SEAL]

Attest:

RUTH C. MASON
Attesting Officer

C. MARSHALL DANN
Commissioner of Patents and Trademarks